United States Patent
Cerra, II et al.

(10) Patent No.: US 8,195,151 B2
(45) Date of Patent: Jun. 5, 2012

(54) METHOD AND APPARATUS FOR INTEGRATING AND COMMUNICATING DATA LINK INFORMATION FROM AN AIRCRAFT TO A GROUND STATION USING A PORTABLE COMMUNICATIONS SYSTEM

(75) Inventors: John J. Cerra, II, Edmond, OK (US); Clovis W. Plantz, Shawnee, OK (US)

(73) Assignee: Arinc Incorporated, Annapolis, MD (US)

( * ) Notice: Subject to any disclaimer, the term of this patent is extended or adjusted under 35 U.S.C. 154(b) by 713 days.

(21) Appl. No.: 12/326,268

(22) Filed: Dec. 2, 2008

(65) Prior Publication Data
US 2009/0310530 A1 Dec. 17, 2009

Related U.S. Application Data

(60) Provisional application No. 61/060,839, filed on Jun. 12, 2008.

(51) Int. Cl.
*H04W 4/00* (2009.01)
(52) U.S. Cl. .......... 455/431; 455/98; 455/410; 455/411; 455/430; 455/11.1; 370/316; 340/945
(58) Field of Classification Search .................. 455/431, 455/98, 410–411; 370/316; 340/945, 961, 340/951; 726/22
See application file for complete search history.

(56) References Cited

U.S. PATENT DOCUMENTS

| | | | |
|---|---|---|---|
| 6,047,165 A | 4/2000 | Wright et al. |
| 6,104,914 A | 8/2000 | Wright et al. |
| 6,108,523 A | 8/2000 | Wright et al. |
| 6,148,179 A | 11/2000 | Wright et al. |
| 6,154,636 A | 11/2000 | Wright et al. |
| 6,154,637 A | 11/2000 | Wright et al. |
| 6,160,998 A | 12/2000 | Wright et al. |
| 6,163,681 A | 12/2000 | Wright et al. |
| 6,167,238 A | 12/2000 | Wright |
| 6,167,239 A | 12/2000 | Wright et al. |
| 6,173,159 B1 | 1/2001 | Wright et al. |
| 6,308,044 B1 | 10/2001 | Wright et al. |
| 6,308,045 B1 | 10/2001 | Wright et al. |
| 6,353,734 B1 | 3/2002 | Wright et al. |
| 6,522,867 B1 | 2/2003 | Wright et al. |
| 6,745,010 B2 | 6/2004 | Wright et al. |
| 6,775,545 B2 | 8/2004 | Wright et al. |
| 6,990,319 B2 | 1/2006 | Wright et al. |

(Continued)

OTHER PUBLICATIONS

'Virgual Machine Technology Enhances Training for Marines'; Signal Online, Feb. 2007, Allan D. Kissam, pp. 1-3.*

(Continued)

*Primary Examiner* — Kamran Afshar
*Assistant Examiner* — Khalid Shaheed
(74) *Attorney, Agent, or Firm* — Ronald E. Prass, Jr.; Prass LLP (57) ABSTRACT

A portable data link integration and communication unit and method that integrates and communicates data link information from an aircraft to a ground station is disclosed. The portable data link integration and communication unit a communication interface that facilitates communications with communication devices, and an integration and communication processing module that receives data link message information from one or more communication devices through the communication interface, integrates the received data link message information, converts integrated data link information into internet protocol information, and transmits the internet protocol information using the communication interface over a satellite network to the ground station for display to a user over a communications network.

18 Claims, 5 Drawing Sheets

U.S. PATENT DOCUMENTS

| | | | |
|---|---|---|---|
| 7,177,638 B2 * | 2/2007 | Funderburk et al. | 455/431 |
| 7,187,927 B1 * | 3/2007 | Mitchell | 455/431 |
| 7,221,290 B2 * | 5/2007 | Burgemeister | 340/945 |
| RE40,479 E | 9/2008 | Wright et al. | |
| 2002/0018008 A1 | 2/2002 | Wright et al. | |
| 2003/0199266 A1 * | 10/2003 | Zavidniak | 455/410 |
| 2005/0220055 A1 * | 10/2005 | Nelson et al. | 370/331 |

OTHER PUBLICATIONS

ARINC; ROBE Sky Network; http://www.arinc.com/products/network_engr/robe.html; copyright 2008 ARINC Incorporated; Dec. 2, 2008.

* cited by examiner

METHOD AND APPARATUS FOR INTEGRATING AND COMMUNICATING DATA LINK INFORMATION FROM AN AIRCRAFT TO A GROUND STATION USING A PORTABLE COMMUNICATIONS SYSTEM

PRIORITY INFORMATION

This non-provisional application claims priority from U.S. Provisional Application Ser. No. 61/060,839, filed Jun. 12, 2008, the content of which is incorporated herein by reference in its entirety.

BACKGROUND OF THE DISCLOSURE

1. Field of the Disclosure

The disclosure relates to data link communications from aircraft.

2. Introduction

In many cases, varying aircraft assets do not have situational awareness visibility of each other due to disparate data link communication systems. Some aircraft are not properly equipped to communicate with other aircraft or ground stations due to space requirements, budgetary constraints, equipment availability, etc. In addition, since such communication systems are permanently mounted, they cannot be easily exchanged for each flight to accommodate the particular event or mission. In addition, the communications presented to a ground station are often in varying formats that may not be usable as a whole due to lack of proper equipment and/or software to display the information.

SUMMARY OF THE DISCLOSURE

A portable data link integration and communication unit and method that integrates and communicates data link information from an aircraft to a ground station is disclosed. The portable data link integration and communication unit a communication interface that facilitates communications with communication devices, and an integration and communication processing module that receives data link message information from one or more communication devices through the communication interface, integrates the received data link message information, converts integrated data link information into internet protocol information, and transmits the internet protocol information using the communication interface over a satellite network to the ground station for display to a user over a communications network.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. The disclosed embodiments concern integrating different data link communications into a unified data link operational situational awareness capability.

The disclosure may concern a method and apparatus for integrating data link communications. In particular, a Specialized Modular Adaptive Roll-on, Roll-off, Tactical Command, Control, Communications and Intelligence (SMARRT C3I) system that may provide a secure carry-on/roll-on reach forward/reach back data link capability over both military and commercial satellite networks in near-real-time. The SMARRT C3I system may also bring a near-real-time situational awareness (SA) display into an aircraft cockpit.

The integration approach in this disclosure may allow for technological capability, such as Link-16 and Situational Awareness Data Link (SADL), to be added to any fixed-wing or rotary wing platform as carry-on equipment. The SMARRT C3I system may require minimal permanent aircraft modification. The system may also be capable of integrating the Integrated Broadcast Service (IBS) intelligence information into the SA display with the addition of an intelligence receiver, such as the Air Force Tactical Receiver System—Ruggedized or the Airborne Quad Zebra.

The addition of these systems into military aircraft, such as Air Force Special Operations Command (AFSOC) aircraft, may provide a direct line-of-sight (LOS) and beyond line-of-sight (BLOS) Command and Control (C2) link between AFSOC assets and C2 assets, such as Airborne Warning and Control System (AWACS), Joint Surveillance Target Attack Radar System (JSTARS), or Air Operations Center (AOC), for example. The SMARRT C3I system may bring an unprecedented Command and Control capability to AFSOC assets. Integration with host platform systems can usually be accomplished with minimal impact to existing platform wiring configurations and may have minimal impact to legacy platform equipment.

The versatility and modularity of the SMARRT C3I system design may also lend itself to installation in other than airborne assets. As an example; the SMARRT C3I system could be configured for use in a Heavy-High Mobility Multipurpose Wheeled Vehicle (HMMWV) or ground structure as a stand-alone asset for use by ground forces The SMARRT C3I system may utilize organized and adaptive software which may provide the communications links to ensure that all authorized participants receive the information essential to their mission. The software design may employ a "gender neutral" message database as its core. Each communications link may be translated from its native format as its information is received and placed into the common message database. This process may enable information to be received from multiple sources—Link 16, Ultra High Frequency (UHF), Demand Assigned Multiple Access (DAMA), satellite communications (SATCOM), SADL/Enhanced Position Location Reporting System (EPLRS), Military Strategic Tactical Relay (MILSTAR),—or other dedicated links that can support the required bandwidth.

The SMARRT C3I system may contain both a Link-16 terminal and a Situational Awareness Data Link (SADL) radio. This structure may enable AFSOC aircraft to enter into either one or both data link networks as applicable to mission needs. The SADL system is the airborne equivalent of the Enhanced Position Location Reporting System (EPLRS) and is currently employed on Close Air Support (CAS) aircraft such as the F-16. The EPLRS system may provide ground forces with the ability to transmit their unit location/position, location/position of enemy forces, or free text messages within the network. SADL may bring the ground picture into the flight deck as a tactical SA picture, for example.

The design of the SMARRT system may enable additional hand-held or laptop computers to be temporarily or permanently mounted on the flight deck, other crew member positions, or in the passenger compartment, for example. Furthermore, the SA display information may be sent remotely to as many positions as desired, either hard-wired through Ethernet cabling, Universal Serial Bus, or via secure wireless equipment, for example. The SMARRT C3I system capabilities may be found in the chart below:

Some of the major capability enhancements that the SMARRT C3I system may provide are discussed below.

Close Air Support: During every CAS mission, Special Operators run the risk of fratricide of friendly forces. The SADL system has proven to be invaluable for fratricide avoidance during CAS missions and is installed and available to close air support "fighter" aircraft for that sole purpose. However, even though the AFSOC AC-130 aircraft supports a CAS role, this essential equipment is not included in the avionics suite of Special Operations platforms.

As a direct result of this limitation, the AC-130 aircraft may not currently be achieving its full capability. Without the benefit of the SA visibility provided by SADL, Special Operations aircraft in CAS roles are potentially more restricted in their support capability than their "fighter" aircraft counterparts.

Airdrop and Extraction: The SADL system may also serve to enhance the ability of cargo aircraft to support ground forces during personnel and equipment drops or personnel extractions. Special Operations crews performing airdrop and extraction missions are, at times, required to rely upon ground forces transmitting position information, primarily via voice commands or continuously transmitting locator beacons, to direct inbound aircraft to drop and pickup locations. This practice requires ground forces to break radio silence for potentially prolonged periods of time allowing for longer triangulation time and increasing the risk of enemy forces pinpointing the location of the drop or pick-up. The short, normally miliseconds, transmission times of the SADL/EPLRS system greatly reduces the chance of detection by triangulation.

Oftentimes, Airlifters are placed in a situation where they are required to make tactical airdrops in potentially hostile territory and are required to enter into the environment "blind" to the location of friendly and enemy aircraft and ground forces. SA information provided by the SMARRT C3I system may give the aircrew near-real-time visibility of the unit(s) they are supporting allowing for the aircrew to see the actual unit position, not where they are anticipated to be, as well as locations of enemy forces.

| Capability | Link-16 Participation | SADL/EPLRS Participation | BLOS Reach-Forward/ Reach-Back | Blue Force Tracking | E-Mail | Chat | Internet - SIPRNET/ NIPRNET Connectivity | Optional BLOS Voice |
|---|---|---|---|---|---|---|---|---|
| System | | | | | | | | |
| UHF SATCOM | | | X | X | | | | X |
| Iridium Transceiver | | | X | X | X | X | X | X |
| INMARSAT Transceiver | | | X | X | X | X | X | X |
| MIDS/LVT | X | | | | | | | |
| SADL Radio | | X | | | | | | |
| Command Processor | | | X | X | X | X | X | |
| Data Link Processor | X | X | X | X | | | | |
| HAIPE Device | | | | | | | X | |
| SAASM GPS Receiver | X | X | | X | | | | |

Near-real-time SA visibility, as a result of the addition of SADL capability, may also improve cargo and personnel drop effectiveness by preventing equipment or personnel from being dropped too closely to enemy forces or too far away from friendly forces.

Link-16: There is an urgent need of many platforms to integrate Link-16 capability into their existing avionics suite. The SMARRT C3I system may provide Link-16 capability to a wide variety of platforms allowing aircraft that are not currently equipped with Link-16 equipment to participate in the network well ahead of plan.

C3I: C3I may be greatly enhanced due the fact that the tactical situational awareness information can be forwarded (reach-back) to decision makers at the applicable Operations Center. This provides for visibility in the "rear" while operations are taking place. In the event that an aircraft needs to be re-vectored or critical time-sensitive information needs to be passed to the aircraft, Operations Center personnel may be capable of secure, near-real-time beyond line-of-sight data or voice communication with the aircrew or passengers (reach-forward). This secure communication may occur over both military and commercial networks. The complete system may operate independently of the legacy aircraft communications systems, for example.

The disclosure may include a method for integrating data link communications using a mobile C3I system. The method may include receiving information from one or more communication devices located within the mobile command, control, communications and intelligence system, wherein the received information concerns at least one of friendly armed forces and opposing armed forces, correlating the received information into a manner that may be presented to a user on a display; and displaying the information on a map display to visually provide the user with information concerning at least one of friendly armed forces and opposing armed forces, the information being at least one of position, identification, speed, course, altitude, and time information.

The disclosure may also concern a mobile C3I system that integrates data link communications. The C3I system may include a plurality of communication devices that receive information concerning at least one of friendly armed forces and opposing armed forces, a correlation module that correlates the information into a manner that may be presented to a user on a map display to visually provide the user with information concerning at least one of friendly armed forces and opposing armed forces, the information being at least one of position, identification, speed, course, altitude, and time information.

Correlation may be performed by any device capable of analyzing, converting, and integrating received information from difference sources into a usable form, such as an Joint Air Defense Systems Integrator JADSI), which is a multilink capable data link processor, for example. The system may receive inputs from a user via a user interface. The user interface may permit the user to adjust settings in the SMARRT C3I system or individual components of the SMARRT C3I system. The user interface may also allow the user to pick which ones of the components to be operating and providing information at any one time.

The SMARRT C3I system may operate using both military and commercial (civilian) communication links. The system may include a removable hard drive to store data for temporary, historical, or analytical purposes. The data received by the SMARRT C3I may be filtered to isolate geographical regions, forces/tactical assets, certain data, etc., for example.

Figure 1:
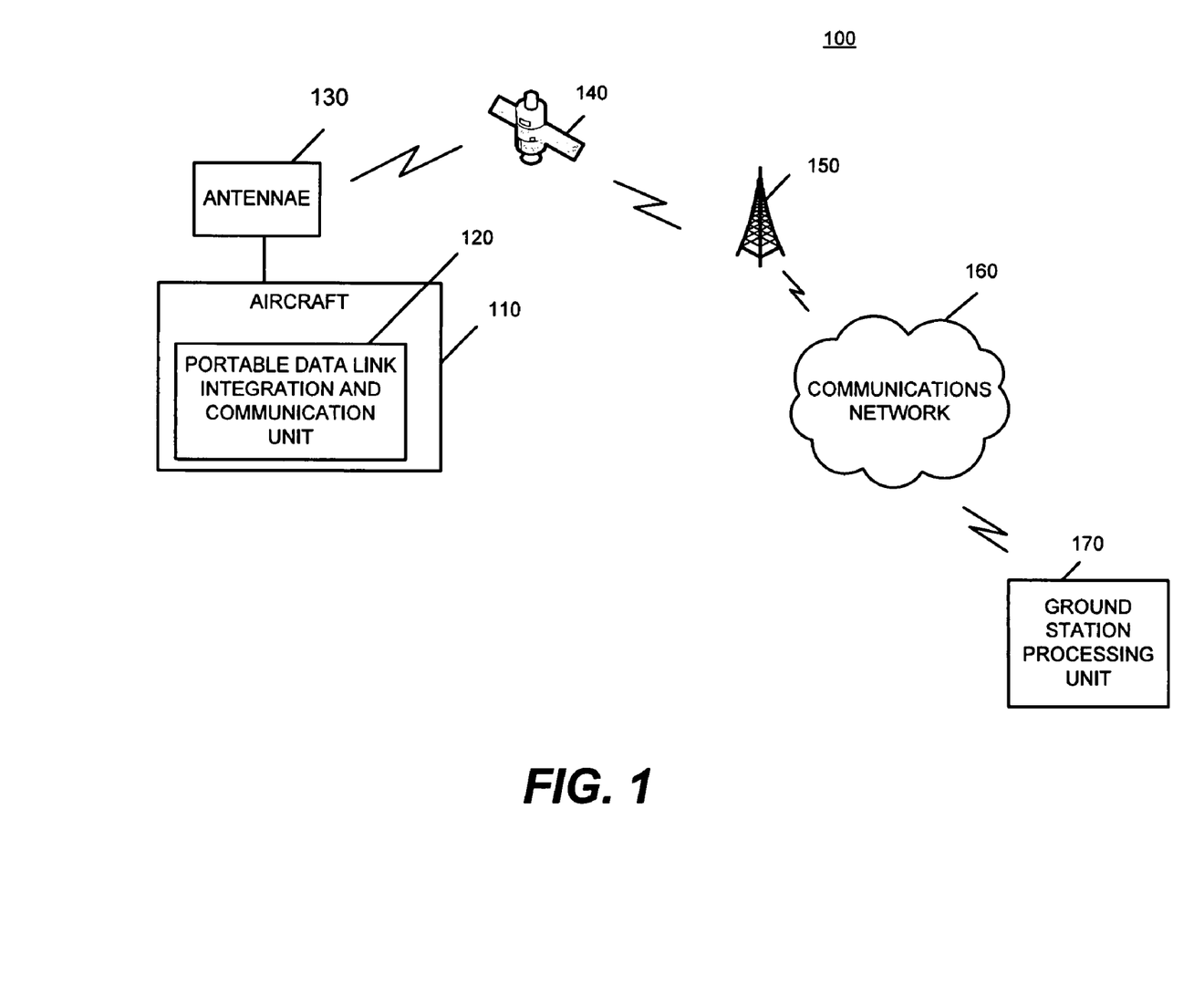
FIG. 1 illustrates an exemplary diagram of a data link communication environment in accordance with a possible embodiment of the disclosure.

FIG. 1 illustrates an exemplary diagram of a data link communication environment 100 in accordance with a possible embodiment of the disclosure. The data link communication environment 100 may include an aircraft 110, one or more satellites 140, one or more communications towers 150, a communication network 160, and one or more ground station processing unit 170. The aircraft 110 may include a plurality of communication devices, various antennae 130 for communications, and a portable data link integration and communication unit 120. The aircraft 110 may represent any type of commercial, private, cargo, or military aircraft. The term aircraft may be defined as any apparatus that may fly, such as an airplane, helicopter, unmanned vehicle, blimp, balloon, etc., for example.

The satellite 140 may represent one or more satellites that orbit the earth and receive, send or relay various types of communications, such as radio, telephone, cellular telephone, internet protocol, video, text, data, etc. for example. The communications tower 150 represent one or more ground-based communications towers that may relay communications from a satellite 140 to a communications network 160 or direct to a ground station. Note also that the ground station processing unit 170 or the communications network 160 may receive communications directly from the satellite 140 without the assistance of the communication towers 150.

The communications network 160 may represent any type communication network that may send and receive communications, such as a military communication network, a secure government communication network, a satellite communication network, a cable communication network, the Internet, an intranet, a local area network, etc., for example. The communications network 160 may communicate with communication devices and data link integration and communication unit 120 on the aircraft 110 through the satellite 140 and one or more communication towers 140, for example.

The data link integration and communication unit 120 may be integrated with the aircraft's avionics, such as positional, navigation, time, attitude, and altitude devices, for example. The portable data link integration and communication unit 120 may also be integrated with the aircraft's existing communication devices, such as radios, radars, antennae 130, etc., for example. The portable data link integration and communication unit 120 may use one or more antennae 130 on the aircraft to facilitate communications in a particular communications mode, such as a SATCOM, UHF, HF, or other communications antenna. The portable data link integration and communication unit 120 may be integrated by use of an umbilical, cable, USB cord, or any other attachment device at will enable the portable data link integration and communication unit 120 to interface, communicate, and exchange information with avionics and communication devices on the aircraft 110.

Figure 2:
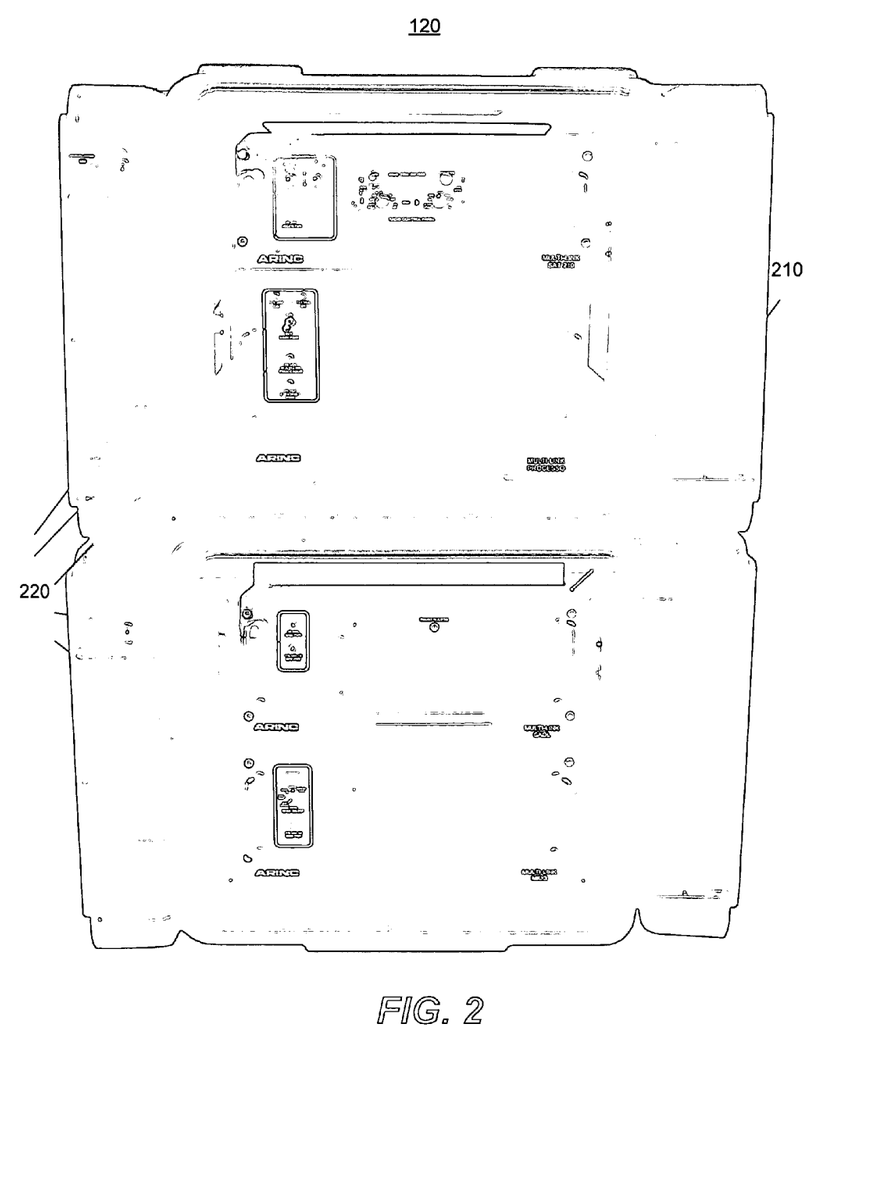
FIG. 2 illustrates an exemplary diagram of a portable data link integration and communication unit in accordance with a possible embodiment of the disclosure.

FIG. 2 illustrates an exemplary diagram of a portable data link integration and communication unit 120 in accordance with a possible embodiment of the disclosure. The portable data link integration and communication unit 120 may include chassis 210, and various communication devices 220. The chassis 210 may be made of any durable material, such as plastic or metal, and houses the components of the portable data link integration and communication unit 120. The portable data link integration and communication unit 120 may also include devices that serve to facilitate transporting the portable data link integration and communication unit 120 on and off or throughout the aircraft 110, such as one or more handles and wheels (not shown). The portable data link integration and communication unit 120 may be secured to the aircraft 110 by any means known to one of skill in the art.

The portable data link integration and communication unit 120 may include ports that may enable the portable data link integration and communication unit 120 to be powered by external power sources, such as an external AC wall socket, or to provide power from the aircraft 110, etc. The ports may include any known or future ports that may connect with current or future aircraft antennae 130. The ports may include any known or future ports that may enable communication with the portable data link integration and communication unit 120 or other devices in the aircraft 110, such as a Universal Serial Bus (USB), Ethernet connections (such as the RJ45), data transmission connections, external WiFi or Internet connection, etc.

Figure 3:
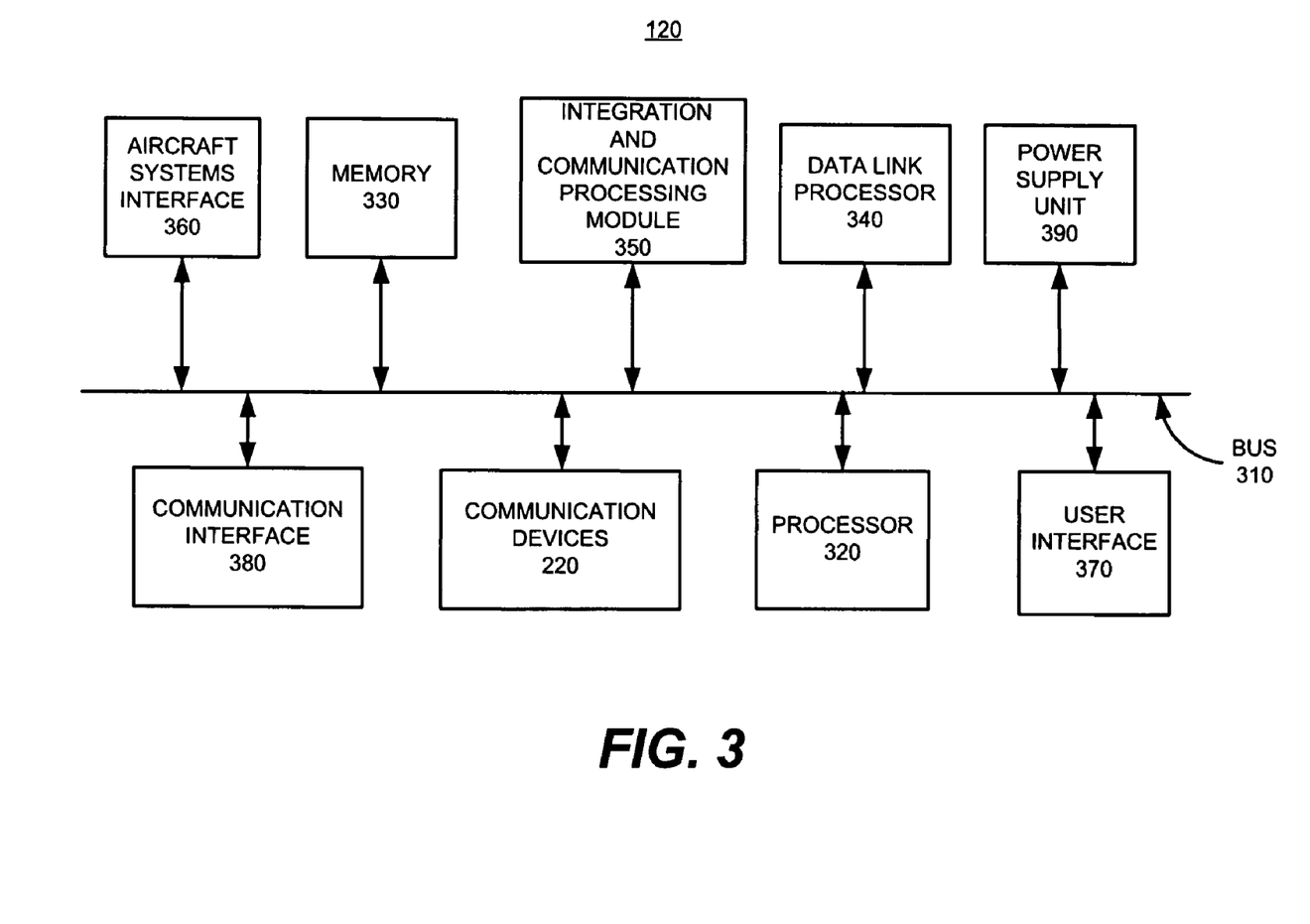
FIG. 3 illustrates an exemplary block diagram of the portable data link integration and communication unit in accordance with a possible embodiment of the disclosure.

FIG. 3 illustrates an exemplary block diagram of the portable data link integration and communication unit 120 in accordance with a possible embodiment of the disclosure. The portable data link integration and communication unit 120 may include bus 310, communication devices 220, controller 320, memory 330, data link processor 340, integration and communication processing module 350, aircraft systems interface 360, user interface 370, communication interface 380, and power supply unit 390.

Bus 310 may permit communication among the components of the portable data link integration and communication unit 120. Processor 320 may include at least one conventional processor or microprocessor that interprets and executes instructions. Memory 330 may be a random access memory (RA or another type of dynamic storage device that stores information and instructions for execution by processor 320. Memory 330 may also include a read-only memory (ROM) which may include a conventional ROM device or another type of static storage device that stores static information and instructions for controller 320.

The communication interface 380 may include any mechanism that facilitates communication outside the aircraft 110 or with various communication devices within the aircraft 110. For example, communication interface 380 may include a modem or a router. Alternatively, communication interface 380 may include other mechanisms for assisting the communication router 390 in communicating with other devices and/or systems via wireless connections.

Aircraft system interface 360 may allow the portable data link integration and communication unit 120 to interface, integrate, communicate and exchange information with the aircraft's avionics and communication systems. Data link processor 340 may receive and process incoming data link communications so that it may be further processed and integrated by the integration and communication processing unit 350.

User interface 370 may be located on a controller panel, for example, and may include one or more conventional input mechanisms that permit a user to input information, communicate with the portable data link integration and communication unit 120, and/or present information to the user, such as a an electronic display, microphone, touchpad, keypad, keyboard, mouse, pen, stylus, voice recognition device, buttons, one or more speakers, etc.

Power supply unit 390 may enable the portable data link integration and communication unit 120 to be powered by both AC and DC power. The power supply unit 390 may be connected to the aircraft in such a manner to receive AC power by using any known connection method, such as an umbilical, cords, harness, cables, etc., for example.

The portable data link integration and communication unit 120 may perform such functions in response to processor 320 by executing sequences of instructions contained in a computer-readable medium, such as, for example, memory 330. Such instructions may be read into memory 330 from another computer-readable medium, such as a storage device or from a separate device via communication interface 380.

Figure 4:
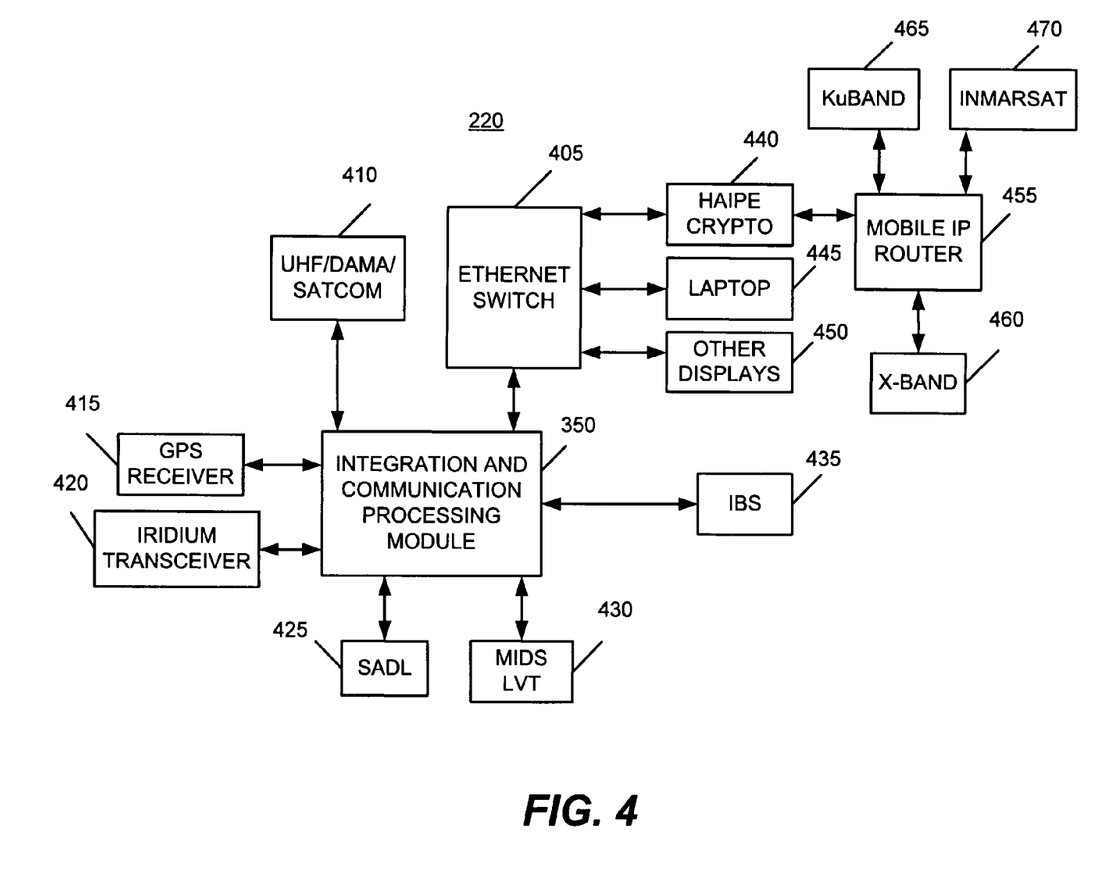
FIG. 4 illustrates an exemplary block diagram of possible communication devices that may be connected to or be part of the data link integration and communication unit in accordance with a possible embodiment of the disclosure and FIG. 5 illustrates an exemplary flowchart of the data link integration and communication process in accordance with a possible embodiment of the disclosure.

The communication devices 220 may be internal to the portable data link integration and communication unit 120 or connected to the portable data link integration and communication unit 120 via any know electrical connection device. FIG. 4 illustrates an exemplary block diagram of possible communication devices 220 that may be connected to or be part of the data link integration and communication unit 120 in accordance with a possible embodiment of the disclosure.

The communication devices 220 that may be included in or attached to the data link integration and communication unit 120 may include Ultra High Frequency (UHF), Demand Assigned Multiple Access (DAMA), Satellite Communication transceiver (SATCOM 410 (combined into one box for ease of display and discussion), Global Positioning System receiver (GPS) 415, Iridium satellite transceiver 420, Situational Awareness Data Link (SADL) 425, Multifunctional Information Distribution System-Low Volume Terminal (MIDS-LVT) (or Link 16) 430, integrated broadcast service (IBS) 435, High Assurance Internet Protocol Encryptor (HAIPE) 440, a laptop or other processing device 445, other displays 450, mobile Internet Protocol router 455, X-Band 460 and Ku Band communication devices 465, and International Marine/Maritime Satellite (INMARSAT) 470. Other communication devices such as those for utilizing the Enhanced Position Location Reporting System (EPLRS) and Military Strategic Tactical Relay (MILSTAR) may be included.

For illustrative purposes, the functions of integration and communication processing module 350 and the integration and communication process will be described below in FIG. 5 in relation to the diagrams shown in FIGS. 1-4.

Figure 5:
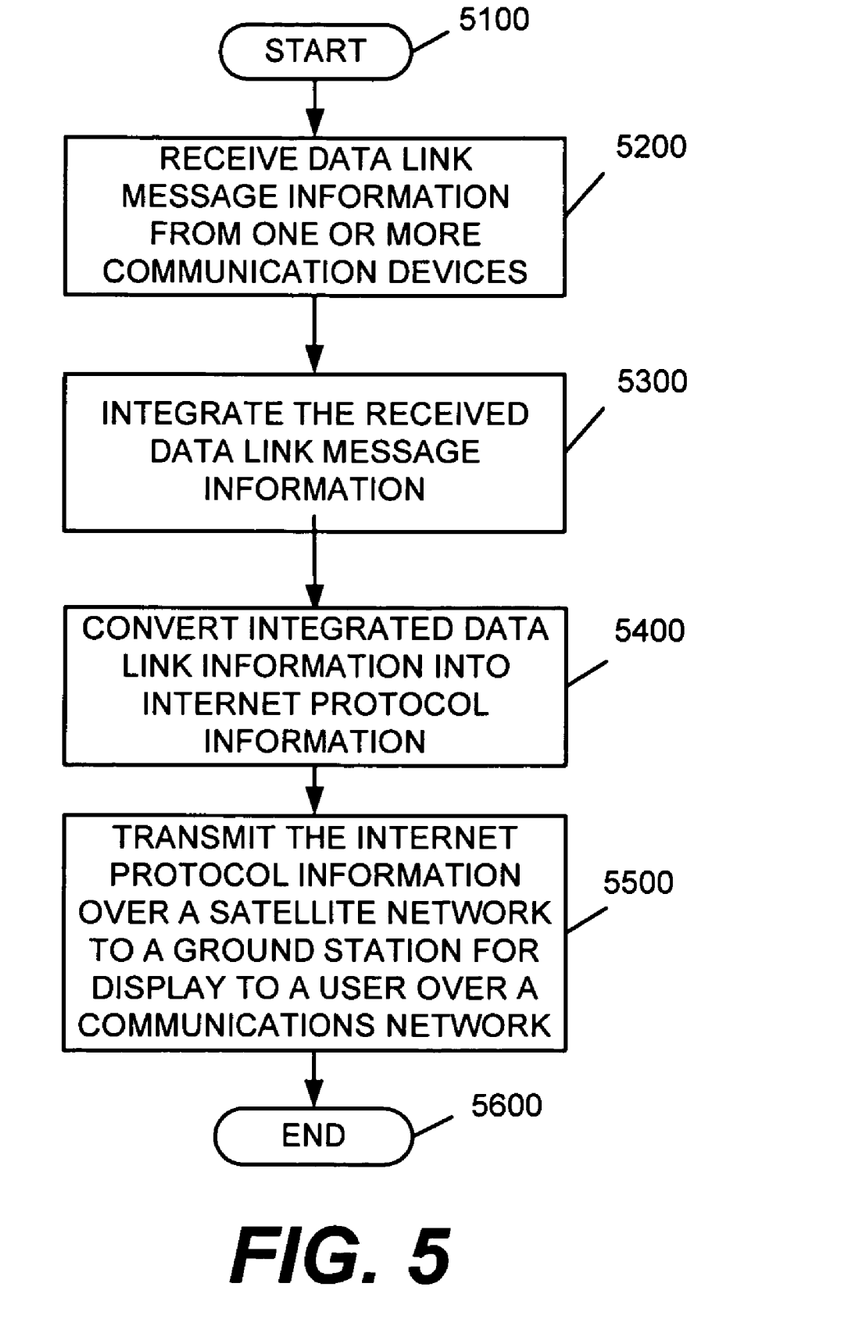

FIG. 5 illustrates an exemplary flowchart of the data link integration and communication process in accordance with a possible embodiment of the disclosure. The process begins at step 5100 and goes to step 5200, where the integration and communication processing module 350 may receive data link message information from one or more communication devices 220 through the communication interface 380. For example, the integration and communication processing module 350 may receives the data link message information from at least one of Link 16, Ultra High Frequency (UHF), Demand Assigned Multiple Access (DAMA), satellite communications (SATCOM, Situational Awareness Data Link (SADL), Enhanced Position Location Reporting System (EPLRS), Military Strategic Tactical Relay (MILSTAR), integrated broadcast service (IBS), Multifunctional Information Distribution System-Low Volume Terminal (MIDS-LVT), International Marine/Maritime Satellite (INMARSAT), Global Positioning System (GPS), Iridium satellite, X-Band and Ku Band communication devices.

At step 5300, the integration and communication processing module 350 may integrate the received data link message information. At step 5400, the integration and communication processing module 350 may convert the integrated data link information into internet protocol information.

At step 5500, the integration and communication processing module 350 may transmit the internet protocol information using the communication interface 280 over a satellite network 140 to the ground station 170 for display to a user over a communications network 160. The internet protocol information may be encrypted by an encryption device (such as the HAIPE 440) prior to transmission. The integration and communication processing module 350 may receive positional information from the GPS receiver 415 or the aircraft's avionics, for example, and transmit the received positional information along with the internet protocol information. The process may then go to step 5600 and end.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the disclosed system each processing the content in various possible ways. It does not necessarily need to be one system used by all end users. Accordingly, the appended claims and their legal equivalents should only define the disclosure, rather than any specific examples given.

We claim:

1. A method of integrating and communicating data link information from an aircraft to a ground station using a portable communications and integration system, comprising:
   receiving data link message information from one or more communication devices;
   integrating the received data link message information;
   converting integrated data link information into internet protocol information; and
   transmitting the internet protocol information from the aircraft over a satellite network to the ground station for display to a user over a communications network,
   a plurality of devices for executing the receiving, the integrating, the converting and the transmitting being housed in an integrated modular portable unit that is at least one of carried or rolled onto the aircraft; and
   the data link message information including at least one of Link-16 and Situational Awareness Data Link (SADL) data link message information that is received from at least one of a Link-16 communication device and a SADL communication device.

2. The method of claim 1, the data link message information being received via a communication link that supports a plurality of Link 16, Ultra High Frequency (UHF), Demand Assigned Multiple Access (DAMA), satellite communications (SATCOM), Situational Awareness Data Link (SADL), Enhanced Position Location Reporting System (EPLRS), Military Strategic Tactical Relay (MILSTAR), integrated broadcast service (IBS), Multifunctional Information Distribution System-Low Volume Terminal (MIDS-LVT), International Marine/Maritime Satellite (INMARSAT), Global Positioning System (GPS), Iridium satellite, X-Band and Ku Band communications.

3. The method of claim 1, further comprising:
   encrypting the internet protocol information prior to transmission.

4. The method of claim 1, further comprising:
   receiving positional information; and
   transmitting the received positional information with the internet protocol information.

5. The method of claim 1, the data link message information being received and the internet protocol information being transmitted using the aircraft's antennae.

6. The method of claim 1, further comprising:
   integrating with at least one of one or more of the aircraft's avionics systems and one or more of the aircraft's communication systems; and
   exchanging information with at least one of the integrated one or more of the aircraft's avionics systems and the integrated one or more of the aircraft's communication systems.

7. The method of claim 1, the satellite network being one of a commercial satellite network, a military satellite network, and an Iridium satellite system.

8. The method of claim 1, the communications network being at least one of a military communication network and a secure government communication network.

9. A portable data link integration and communication unit that integrates and communicates data link information from an aircraft to a ground station, comprising:
   a communication interface that facilitates communications with communication devices; and
   an integration and communication processing module that (1) receives data link message information from one or more communication devices through the communication interface, (2) integrates the received data link message information, (3) converts integrated data link information into internet protocol information, and (4) transmits the internet protocol information using the communication interface over a satellite network to the ground station for display to a user over a communications network, the integration and communication processing module comprising a plurality of devices for executing the receiving, the integrating, the converting and the transmitting housed in an integrated modular portable unit that is at least one of carried or rolled onto the aircraft,
   the data link message information being at least one of Link-16 and Situational Awareness Data Link (SADL) data link message information that is received from at least one of a Link-16 communication device and a SADL communication device.

10. The portable data link integration and communication unit of claim 9, the integration and communication processing module receiving the data link message information via a communication link that supports a plurality of Link 16, Ultra High Frequency (UHF), Demand Assigned Multiple Access (DAMA), satellite communications (SATCOM), Situational Awareness Data Link (SADL), Enhanced Position Location Reporting System (EPLRS), Military Strategic Tactical Relay (MILSTAR), integrated broadcast service (IBS), Multifunctional Information Distribution System-Low Volume Terminal (MIDS-LVT), International Marine/Maritime Satellite (INMARSAT), Global Positioning System (GPS), Iridium satellite, X-Band and Ku Band communications.

11. The portable data link integration and communication unit of claim 9, further comprising:
an encryption device that encrypts the Internet protocol information prior to transmission.

12. The portable data link integration and communication unit of claim 9, the integration and communication, processing module receiving positional information and transmitting the received positional information with the internet protocol information.

13. The portable data link integration and communication unit of claim 9, the integration and communication processing module receiving the data link message information and transmitting the internet protocol information using the aircraft's antennae.

14. The portable data link integration and communication unit of claim 9, the integration and communication processing module integrating and exchanging information with at least one of one or more of the aircraft's avionics systems and one or more of the aircraft's communication systems.

15. The portable data link integration and communication unit of claim 9, the satellite network being one of a commercial satellite network, a military satellite network, and an Iridium satellite system.

16. The portable data link integration and communication unit of claim 9, the communications network being at least one of a military communication network and a secure government communication network.

17. A portable data link integration and communication unit that integrates and communicates data link information from an aircraft to a ground station, comprising:
a communication interface that facilitates communications with communication devices; and
an integration and communication processing module that (1) receives data link message information from one or more communication devices through the communication interface using the aircraft's antennae, (2) receives positional information, (3) integrates the received data link message information and the received positional information, (4) converts integrated data link information into Internet protocol information, and (5) transmits the internet protocol information using the communication interface using the aircraft's antennae over a satellite network to the ground station for display to a user over a communications network, the integration and communication processing module comprising a plurality of devices for executing the receiving, the integrating, the converting and the transmitting housed in an integrated modular portable unit that is at least one of carried or rolled onto the aircraft,
the data link message information being at least one of Link-16 and Situational Awareness Data Link (SADL) data link message information that is received from at least one of a Link-16 communication device and a SADL communication device.

18. The portable data link integration and communication unit of claim 17, the integration and communication processing module receiving the data link message information via a communication link that supports a plurality of Link 16, Ultra High Frequency (UHF), Demand Assigned Multiple Access (DAMA), satellite communications (SATCOM), Situational Awareness Data Link (SADL), Enhanced Position Location Reporting System (EPLRS), Military Strategic Tactical Relay (MILSTAR), integrated broadcast service (IBS), Multifunctional Information Distribution System-Low Volume Terminal (MIDS-LVT), International Marine/Maritime Satellite (INMARSAT), Global Positioning System (GPS), Iridium satellite, X-Band and Ku Band communications.

* * * * *